(12) United States Patent
Styron

(10) Patent No.: US 6,251,178 B1
(45) Date of Patent: Jun. 26, 2001

(54) FLY ASH COMPOSITION

(75) Inventor: Robert William Styron, Marietta, GA (US)

(73) Assignee: Mineral Resource Technologies, LLC, Atlanta, GA (US)

( * ) Notice: Subject to any disclaimer, the term of this patent is extended or adjusted under 35 U.S.C. 154(b) by 0 days.

(21) Appl. No.: 09/493,370

(22) Filed: Jan. 28, 2000

Related U.S. Application Data

(60) Provisional application No. 60/117,818, filed on Jan. 29, 1999.

(51) Int. Cl.$^7$ .................................................. C04B 7/13
(52) U.S. Cl. .................... 106/709; 106/706; 106/DIG. 1
(58) Field of Search .................................. 106/706, 709, 106/DIG. 1

(56) References Cited

U.S. PATENT DOCUMENTS

| | | | |
|---|---|---|---|
| 4,121,945 | 10/1978 | Hurst et al. ............................ | 106/405 |
| 4,226,630 | 10/1980 | Styron ................................... | 588/257 |
| 4,313,753 | 2/1982 | Segawa et al. ......................... | 71/61 |
| 4,328,037 | 5/1982 | Demirel et al. ........................ | 106/705 |
| 4,624,711 | 11/1986 | Styron ................................... | 106/405 |
| 4,640,715 | 2/1987 | Heitzmann et al. ................... | 106/706 |
| 4,842,649 | 6/1989 | Heitzmann ............................ | 106/706 |
| 4,877,453 | 10/1989 | Loggers ................................. | 106/710 |
| 4,961,790 | 10/1990 | Smith et al. ........................... | 106/823 |
| 4,997,484 | 3/1991 | Gravitt et al. ......................... | 106/708 |
| 5,196,620 | 3/1993 | Gustin et al. .......................... | 588/257 |
| 5,227,047 | 7/1993 | Hwang .................................. | 209/166 |
| 5,299,692 | 4/1994 | Nelson et al. ......................... | 209/2 |
| 5,352,288 | 10/1994 | Mallow ................................. | 106/605 |
| 5,374,308 | 12/1994 | Kirkpatrick et al. ................. | 106/705 |
| 5,387,283 | 2/1995 | Kirkpatrick et al. ................. | 106/709 |
| 5,439,518 | 8/1995 | Francis et al. ........................ | 106/705 |
| 5,456,363 | 10/1995 | Groppo et al. ........................ | 209/166 |
| 5,489,334 | 2/1996 | Kirkpatrick et al. ................. | 106/709 |
| 5,490,889 | * 2/1996 | Kirkpatrick et al. ................. | 106/709 |
| 5,513,755 | 5/1996 | Heavilon et al. ...................... | 209/2 |
| 5,584,926 | 12/1996 | Borgholm et al. .................... | 106/713 |
| 5,624,491 | 4/1997 | Liskowitz et al. .................... | 106/705 |
| 5,714,003 | * 2/1998 | Styron .................................. | 106/705 |
| 5,997,632 | * 12/1999 | Styron .................................. | 106/705 |

FOREIGN PATENT DOCUMENTS 59-26957 * 2/1984 (JP) .

OTHER PUBLICATIONS

Proposed AASHTO Guide Specification For Highway Construction, 1998; Developed and submitted by the AASHTO Lead State Team on ASR; pp. 1–8 (No month).

Stark, D., Lithium Salt Admixtures–An Alternative Method to Prevent Expansive Alkali–Silica Reactivity; 9th International Conference on Alkali–Aggregate Reaction in Concrete, London, Jul. 1992; pp. 1–6.

Alkali–silica reactivity inhibitor; Boral Material Technologies Inc.; Jan. 2000.

Alkali–Silica Reactivity Inhibitor Admixture; Boral Material Technologies Inc.; Sep. 2000.

Stokes et al., A Lithium–Based Admixture for ASR Control That Does Not Increase the Pore Solution pH; Fifth CANMET/ACI International Conference on Superplasticizers and Other Chemical Admixtures: 1997.

Ramachandran, "Concrete Admixtures Handbook–Properties, Science and Technology", Noyes Publications, p. 526, 1984 (no month).

Appendix F, "Handbook for the Identification of Alkali––Silica Reactivity in Highway Structures," Strategic Highway Research Program, 1991 (no month).

"Guide to Alkali–Aggregate Reactivity," Mid–Atlantic Regional Technical Committee, Jun, 1993.

Helmuth, "Alkali–Silica Reactivity: An Overview of Research," Strategic Highway Research Program, 1993 (no month).

Stark et al., "Eliminating or Minimizing Alkali–Silica Reactivity," Strategic Highway Research Program, 1993 (no month).

Chemical Abstracts Search, Sep. 24, 1997.

Dialog Article Search, Sep. 25, 1997.

Section 03050 Alkali–Silica Reactivity Inhibitor Admixture Product Guide Specification, Boral Material Technologies Inc.; Sep. 2000.

* cited by examiner

*Primary Examiner*—Anthony Green
(74) *Attorney, Agent, or Firm*—Killworth, Gottman, Hagan & Schaeff, L.L.P.

(57) ABSTRACT

A fly ash composition is provided which includes an amount of lithium carbonate to reduce alkali silica reactivity when the fly ash composition is used in concrete applications. The fly ash composition includes from about 0.5 wt.% to about 98% wt.% subbituminous fly ash and from about 0.5 wt.% to about 3 wt.% lithium carbonate.

6 Claims, No Drawings

FLY ASH COMPOSITION

CROSS REFERENCE TO RELATED APPLICATIONS

This application claims the benefit of U.S. provisional application Ser. No. 60/117,818 filed Jan. 29, 1999.

BACKGROUND OF THE INVENTION

The present invention is directed to a fly ash composition, and more particularly, to a fly ash composition including lithium carbonate which has a reduced susceptibility to alkali-aggregate reactivity based when used in cementitious compositions.

Fly ash comprises finely divided inorganic products produced by the combustion of coal. Enormous amounts of fly ash are produced annually nationwide, principally from burning coal in electric power plants. Disposal of fly ash poses an increasingly difficult problem because the volume, the particulate nature and the varied chemical composition of fly ash limit the number of acceptable disposal sites. Such sites require sophisticated and expensive engineering, design, construction and operational controls to be in place to manage and dispose of the fly ash. Furthermore, the capacity of these disposal sites is not unlimited.

Fly ash of particular composition has been used as an additive in portland cement but such cements have not been hydraulic, i.e., self-setting. Rather, the fly ash has been added to strengthen the cement, evidently, by reacting with excess lime and by reacting with sulfate compounds which would otherwise attack the tricalcium aluminate and tetracalcium aluminoferrite compounds of portland cement.

U.S. Pat. No. 4,382,649 to Heitzmann et al. describes a cement composition which contains fly ash. The composition contains from 50 parts to about 80 parts portland cement; from 13 parts to about 35 parts fly ash; and from 1 part to about 5 parts potassium carbonate. The composition may additionally include up to about 10 parts metakaolin; up to about 6 parts slag; and up to 4 parts of an admixture. However, such a composition may still be subject to alkali silica reactivity.

Chemical reactions between alkalies and aggregates in concrete mixtures result in a shorter useful life and deterioration of structures formed from the concrete mixture. The alkali compounds in the mixture react with certain aggregates in the concrete resulting in an increased pH of the pore solution in the concrete. For such reactions to take place, the concrete must be subjected to a certain amount of moisture during service.

Concrete is essentially a two component system comprising a paste portion and an aggregate portion. The paste portion is a product of the hydration reaction between the cementitious materials and water. The paste portion is formed from a matrix of solid material with an internal network of interconnected pores. When water enters these pores, it moves through the pores solubilizing salts of calcium and alkali metals. As these salts are dissolved, the pH of the pore solution increases as a result of an increase of hydroxide ions in the pores. As the hydroxide ions react with reactive silica in the aggregate to solubilize the silica, a gel is produced which may cause the concrete to crack. Researchers believe that this cracking is a result of the gel absorbing water.

In order for alkali-aggregate reactivity to become problematic, three factors are necessary. First, reactive forms of silica must be present in the aggregate. Amorphous, or noncrystalline and poorly crystalline silica, such as volcanic glasses and opal, are the most reactive forms. Other rapidly reacting forms include tridymite, cristobalite and chalcedony. Second, the concrete pore solution must have a high alkali content. This is because the hydroxide ion concentration increases as the alkali content increases. Third, sufficient moisture must exist to initiate the reactivity. Concrete which contacts the ground or water or is periodically wetted most likely will contain sufficient moisture to cause reactivity.

Thus, a need has developed in the art for a hydraulic fly ash composition which can be used for a variety of purposes and which is less susceptible to alkali silica reactivity.

SUMMARY OF THE INVENTION

The present invention provides a solution to the current needs in the art by converting fly ash into a useful product and by reducing alkali silica reactivity of concrete formed using the fly ash composition. The fly ash composition of the present invention can be used in cementitious and concrete compositions and may be formulated to have a wide range of curing times so that it can be used for a variety of purposes from patching to making concrete objects.

In one embodiment of the invention, a fly ash composition is provided which comprises from about 0.5 wt. % to about 98 wt. % of a subbituminous fly ash; and from about 0.5 wt. % to about 3 wt. % of lithium carbonate.

In another embodiment of the invention, a hydraulic cementitious composition is provided comprising from about 41 wt. % to about 77 wt. % of a portland cement; from about 22 wt. % to about 60 wt. % of a subbituminous fly ash; and from about 0.5 wt. % to about 3 wt. % of lithium carbonate. The cementitious composition may additionally include up to about 5 wt. % of metakaolin ($Al_2O_3 \cdot SiO_2$).

Another aspect of the present invention is directed to a concrete mix employing the hydraulic cementitious composition described above. The concrete mix comprises from about 5 wt. % to about 20 wt. % of a hydraulic cementitious composition including from about 41 wt.% to about 77 wt.% of a portland cement, from about 22 wt.% to about 60 wt.% of a subbituminous fly ash, and from about 0.5 wt.% to about 3 wt.% of lithium carbonate; from about 35 wt. % to about 50 wt. % stone; from about 20 wt. % to about 35 wt. % sand; and from about 3 wt. % to about 10 wt. % water. The concrete mix may also include up to 600 ml of a water reducer and up to 100 ml of an air entraining agent.

Other objects and advantages of the present invention will become apparent from the following detailed description and the appended claims.

DETAILED DESCRIPTION OF THE PREFERRED EMBODIMENT

Fly ash produced by the combustion of subbituminous coal forms hard, stable products almost instantaneously with the addition of water. However, with addition of certain additives, the fly ash can be made into a useful hydraulic fly ash composition. Fly ash is typically recovered by means of electrostatic precipitators in electric power plant smokestacks. Because of its ability to set to a dense solid in a matter of minutes upon the addition of water, subbituminous fly ash is useful to form a hydraulic composition. Fly ash recovered from the combustion of coal from the Powder River Basin is the desirable subbituminous fly ash for use in the fly ash compositions of this invention. The Powder River Basin coal deposits occur in a well-defined region of northern Wyoming and southern Montana. Typically, this type of fly ash has a lime content of greater than or equal to about 25%.

Subbituminous fly ash useful to make the composition of the present invention desirably shows the following components upon analysis:

| Component | Proportion (wt. %) |
|---|---|
| $SiO_2$ | 20-40 |
| $Al_2O_3$ | 10-30 |
| $Fe_2O_3$ | 3-10 |
| MgO | 0.5-8 |
| $SO_3$ | 1-8 |
| $TiO_2$ | 0.5-2 |
| C | 0.5-2 |
| $H_2O$ | 0.33-3 |
| CaO | 25-35 |
| $K_2O$ | 0.5-4 |
| $Na_2O$ | 0.5-6 |

The fineness of the fly ash will ordinarily be such that less than about 34% is retained on a 325 mesh sieve (U.S. Series) as tested on ASTM Test Proc. C-311 ("Sampling and Testing Procedures for Fly Ash as Mineral Admixture for Portland cement Concrete"). This fly ash is preferably recovered and used dry because of its self-setting nature.

As stated above, one aspect of the present invention is directed to a fly ash composition formulated with subbituminous fly ash. The fly ash composition may comprise from about 0.5 wt. % to about 98 wt. % of a subbituminous fly ash; and from about 0.5 wt. % to about 3 wt. % of lithium carbonate. This composition may be utilized in concrete.

A hydraulic cementitious composition may also be provided which comprises from about 41 wt. % to about 77 wt. % of a portland cement; from about 22 wt. % to about 60 wt. % of a subbituminous fly ash; and from about 0.5 wt. % to about 3 wt. % of lithium carbonate. The cementitious composition may additionally include up to about 5 wt. % of metakaolin.

Another aspect of the present invention is directed to concrete mixes containing the hydraulic cementitious composition of the present invention. The concrete mix comprises from about 5 wt. % to about 20 wt. % of a hydraulic cementitious composition including from about 41 wt. % to about 77 wt. % of a portland cement, from about 22 wt. % to about 60 wt. % of a subbituminous fly ash, and from about 0.5 wt. % to about 3 wt. % of lithium carbonate; from about 35 wt. % to about 50 wt. % stone; from about 20 wt. % to about 35 wt. % sand; and from about 3 wt. % to about 10 wt. % water. The concrete mix may also include up to 600 ml of a water reducer and/or up to 100 ml of an air entraining agent.

The fly ash composition of the present invention, and the hydraulic cementitious composition and concrete mix subsequently formed using that fly ash composition, all include lithium carbonate, $Li_2CO_3$. By including lithium carbonate, the compositions of the present invention are less susceptible to alkali silica reactions which could damage the concrete once it has been put in place. Lithium carbonate is thought to form lithium silicate compounds which prevent the formation of an expansive gel which disrupts the hardened concrete structure during the alkali-silica reactivity process.

In order that the invention may be more readily understood, reference is made to the following example which is intended to illustrate the invention, but not limit the scope thereof.

EXAMPLE 1

The following concrete mixes were formed using the indicated components in the indicated amounts.

Mix #1

| Ingredient | Lbs/yd |
|---|---|
| Portland Cement | 400 |
| Class C Fly ash | 160 |
| #57 stone | 1960 |
| Sand | 1250 |
| Lithium carbonate (1%) | 5.6 |
| Water reducer | 497 ml |
| Air entraining agent | 67.5 ml |
| Water | 273 |

Mix #2

| Ingredient | Lbs/yd |
|---|---|
| Portland Cement | 315 |
| Class C Fly ash | 135 |
| #57 stone | 1960 |
| Sand | 1380 |
| Lithium carbonate (1%) | 4.5 |
| Water reducer | — |
| Air entraining agent | 40.5 ml |
| Water | 278 |

Mix #3

| Ingredient | Lbs/yd |
|---|---|
| Portland Cement | 270 |
| Class C Fly ash | 180 |
| #57 stone | 1960 |
| Sand | 1380 |
| Lithium carbonate (1%) | 4.5 |
| Water reducer | — |
| Air entraining agent | 40.5 ml |
| Water | 273 |

Mix #4

| Ingredient | Lbs/yd |
|---|---|
| Portland Cement | 225 |
| Class C Fly ash | 225 |
| #57 stone | 1955 |
| Sand | 1400 |
| Lithium carbonate (1%) | 4.5 |
| Water reducer | — |
| Air entraining agent | 40.5 ml |
| Water | 265 |

Mix #5

| Ingredient | Lbs/yd |
| --- | --- |
| Portland Cement | 500 |
| Class C Fly ash | 150 |
| #57 stone | 1960 |
| Sand | 1180 |
| Lithium carbonate (1%) | 6.5 |
| Water reducer | 577 ml |
| Air entraining agent | 40.5 ml |
| Water | 265 |

Mix #6

| Ingredient | Lbs/yd |
| --- | --- |
| Portland Cement | 385 |
| Class C Fly ash | 165 |
| #57 stone | 1960 |
| Sand | 1295 |
| Lithium carbonate (1%) | 5.5 |
| Water reducer | — |
| Air entraining agent | 40.5 ml |
| Water | 280 |

Mix #7

| Ingredient | Lbs/yd |
| --- | --- |
| Portland Cement | 330 |
| Class C Fly ash | 220 |
| #57 stone | 1960 |
| Sand | 1288 |
| Lithium carbonate (1%) | 5.5 |
| Water reducer | — |
| Air entraining agent | 48.6 ml |
| Water | 278 |

Mix #8

| Ingredient | Lbs/yd |
| --- | --- |
| Portland Cement | 275 |
| Class C Fly ash | 275 |
| #57 stone | 1960 |
| Sand | 1288 |
| Lithium carbonate (1%) | 5.5 |
| Water reducer | — |
| Air entraining agent | 48.6 ml |
| Water | 278 |

Mix #9

| Ingredient | Lbs/yd |
| --- | --- |
| Portland Cement | 170 |
| Class C Fly ash | 250 |
| #57 stone | 1960 |
| Sand | 1450 |
| Lithium carbonate (1%) | 4.2 |
| Water reducer | — |
| Air entraining agent | 32.4 ml |
| Water | 262 |

Mix #10

| Ingredient | Lbs/yd |
| --- | --- |
| Portland Cement | 210 |
| Class C Fly ash | 210 |
| #57 stone | 1960 |
| Sand | 1450 |
| Lithium carbonate (1%) | 4.2 |
| Water reducer | 186 ml |
| Air entraining agent | 32.4 ml |
| Water | 270 |

The fly ash compositions of the present invention are useful for forming concrete objects. Particularly, the fly ash compositions of the present invention can be used to manufacture concrete objects. Representative concrete objects include, but are not limited to, the following: concrete masonry units, such as bricks, blocks, and tiles; concrete pipe; prestress concrete; specialty concrete units, such as burial vaults, septic tanks, and prefabricated concrete units; roadways; and ornamental objects and statuary.

Concrete objects formed from the fly ash/cementitious compositions and concrete mixes of the present invention do not require special curing equipment or processes. The curing time of the concrete mixes of the present invention can be adjusted by adjusting the concentrations of the various ingredients in the fly ash compositions and/or the concrete mixes. For example, conventional masonry units are heated in a kiln, and/or steam cured for periods of time which often exceed 24 hours. On the other hand, masonry units formed using the fly ash compositions and concrete mixes of the present invention do not require either heating or steam curing because the fly ash compositions and the concrete mixes of the present invention can be formulated to set and cure in less than one hour and, preferably, when forming masonry units, can be formulated to set and cure to a required strength in about 30 minutes. Further, concrete objects formed from the fly ash compositions and concrete mixes of the present invention exhibit negligible, if any, water absorption.

The fly ash/cementitious compositions and concrete mix of the present invention can also be used to construct concrete articles such as roadways. Because the compositions of the present invention can be formulated for quick curing and high strength, a roadway, which is constructed using the fly ash/cementitious compositions or concrete mix of the present invention, can be laid and ready for use in less than 24 hours. The quick curing nature of such compositions is particularly attractive in areas which experience high roadway usage and traffic. Further, roadways formed from the compositions of the present invention will have an improved useful life and strength when compared to asphalt.

One of skill in the art will appreciate that the fly ash/ cementitious compositions and concrete mixes of the present invention have a wide variety of uses and that not all of those uses have been described herein.

While certain representative embodiments and details have been presented for purposes of illustrating the invention, it will be apparent to those skilled in the art that various changes in the fly ash compositions and concrete mixes disclosed herein may be made without departing from the scope of the invention, which is defined in the appended claims.

What is claimed is:

1. A hydraulic cementitious composition comprising from about 41 wt. % to about 77 wt. % of a portland cement; from about 22 wt. % to about 60 wt. % of a subbituminous fly ash; and from about 0.5 wt. % to about 3 wt. % of lithium carbonate.

2. The cementitious composition of claim 1 further including up to about 5 wt. % of metakaolin.

3. A concrete mix comprising from about 35 wt. % to about 50 wt. % stone; from about 20 wt. % to about 35 wt. % sand; from about 3 wt. % to about 10 wt. % water; and from about 5 wt. % to about 20 wt. % of a hydraulic cementitious composition including from about 41 wt. % to about 77 wt. % of a portland cement, from about 22 wt. % to about 60 wt. % of a subbituminous fly ash, and from about 0.5 wt. % to about 3 wt. % of lithium carbonate.

4. The concrete mix of claim 3 further including up to 600 ml of a water reducer.

5. The concrete mix of claim 3 further including up to 100 ml of an air entraining agent.

6. The concrete mix of claim 3 wherein the hydraulic cementitious composition further includes up to about 5 wt. % of metakaolin.

* * * * *